United States Patent [19]

Smart

[11] Patent Number: 5,552,855
[45] Date of Patent: *Sep. 3, 1996

[54] DETECTING APPARATUS FOR FINDING A REFERENCE EXPOSURE MADE ON A LEADING AND/OR TRAILING PORTION OF A FILMSTRIP

[75] Inventor: David C. Smart, Rochester, N.Y.

[73] Assignee: Eastman Kodak Company, Rochester, N.Y.

[ * ] Notice: The term of this patent shall not extend beyond the expiration date of Pat. No. 5,452,055.

[21] Appl. No.: 426,387

[22] Filed: Apr. 21, 1995

[51] Int. Cl.⁶ .................................................. G03B 27/52
[52] U.S. Cl. ................. 355/41; 250/559.02; 250/559.44
[58] Field of Search .................................. 355/40, 41, 77, 355/75; 352/92, 235, 236; 250/559.02, 559.40, 559.44

[56] References Cited

U.S. PATENT DOCUMENTS

| | | | |
|---|---|---|---|
| Re. 34,362 | 8/1993 | Klosterhuber et al. | 355/40 |
| 4,260,245 | 4/1981 | Hujer | 355/40 |
| 4,279,502 | 7/1981 | Thurm et al. | 355/77 X |
| 4,295,713 | 10/1981 | Edwards | 352/235 |
| 4,555,632 | 11/1985 | Vockenhuber | 250/560 |
| 4,691,112 | 9/1987 | Wydler | 250/570 |
| 4,821,061 | 4/1989 | Gudmundson et al. | 355/40 |
| 4,864,149 | 9/1989 | Matsumoto | 355/41 |
| 4,933,711 | 6/1990 | Gudmundson et al. | 355/40 |
| 4,972,214 | 11/1990 | Shibayama et al. | 364/173.1 |
| 5,124,742 | 6/1992 | Yoshikawa | 355/27 |
| 5,128,519 | 7/1992 | Tokuda | 235/375 |
| 5,179,266 | 1/1993 | Imamura | 235/375 |
| 5,260,740 | 11/1993 | Seto | 355/41 |
| 5,285,235 | 2/1994 | Frick | 355/41 |
| 5,452,055 | 9/1995 | Smart | 355/40 X |

Primary Examiner—A. A. Mathews
Attorney, Agent, or Firm—Roger A. Fields

[57] ABSTRACT

To find a reference exposure located on a non-perforated leading and/or trailing portion of a filmstrip in conformity with picture-taking exposures made on the filmstrip between successive pairs of evenly spaced exposure-locating perforations in the filmstrip, a pair of perforation sensors are spaced apart a distance which is the same as the pitch of the exposure-locating perforations. When one of the two sensors detects an exposure-locating perforation and the other does not, the reference exposure made on the leading or trailing portion is found.

2 Claims, 6 Drawing Sheets

DETECTING APPARATUS FOR FINDING A REFERENCE EXPOSURE MADE ON A LEADING AND/OR TRAILING PORTION OF A FILMSTRIP

CROSS-REFERENCE TO A RELATED APPLICATION

Reference is made to commonly assigned copending application Ser. No. 08/275,219, entitled APPARATUS AND METHOD FOR MAKING A REFERENCE EXPOSURE ON A LEADING AND/OR TRAILING PORTION OF A FILMSTRIP and filed Jul. 14, 1994 in the name of David C. Smart, now U.S. Pat. No. 5,422,055, issued Sep. 19, 1995.

The cross-referenced application is incorporated in this application.

FIELD OF THE INVENTION

The invention relates generally to the field of photography, and in particular to a detecting apparatus for finding a reference (or test) exposure made on a leading and/or trailing portion of a filmstrip.

BACKGROUND OF THE INVENTION

It is known to provide one or more reference exposures on a filmstrip, in addition to the picture-taking exposures made on the filmstrip, for a variety of uses. For example, the reference exposure might be a gray scale consisting of a series of gray tones extending in regular steps of increasing depth of tone from white (or clear) to black (or opaque). Typically, the gray scale is used during photofinishing as a test object for adjusting exposure and development to give true color balance in making three color separation negatives. The reference exposure typically is made on the filmstrip by the film manufacturer, the photographer, or the photofinisher.

Prior art U.S. Pat. No. 4,260,245, issued Apr. 7, 1981, discloses apparatus for making reference exposures on marginal portions of a filmstrip between successive pairs of metering perforations in the filmstrip. While the metering perforations act as key points to critically locate the reference exposures relative to the picture-taking exposures made on the filmstrip, the marginal portions are relatively small and therefore severely restrict the size of the reference exposures. Preferably, the reference exposures should be the same size as the picture-taking exposures.

A conventional 35mm filmstrip has its metering perforations continue along the entire length of the filmstrip, including the leading and trailing portions of the filmstrip. When a photofinisher wishes to make a reference exposure such as a gray scale on the leading and/or trailing portion of the filmstrip, the photofinisher does not know the exact locations that the picture-taking exposures begin and end on the filmstrip. Consequently, the metering perforations cannot serve as key points to critically locate the reference exposure on the leading and/or trailing portion in conformity with the picture-taking exposures. If the reference exposure is not located in conformity with the picture-taking exposures, control during the printing process is difficult.

THE CROSS-REFERENCED APPLICATION

The cross-referenced application discloses a method of making a reference exposure on a filmstrip in conformity with the picture-taking exposures made on the filmstrip. The method comprises the steps of:

selecting a filmstrip that has a series of evenly spaced exposure-locating perforations with a pitch slightly greater than the width of the reference exposure and has a leading and/or trailing non-perforated portion preceding or following the exposure-locating perforations;

determining, using a pair of perforation sensors spaced apart a distance which is the same as the pitch of the series of exposure-locating perforations, that one of the sensors has detected one of the exposure-locating perforations and the other has not to identify the leading or trailing non-perforated portion of the filmstrip; and making the reference exposure on the leading or trailing portion of the filmstrip when one of the sensors has detected one of the exposure-locating perforations and the other has not, whereby the reference exposure can be located in conformity with picture-taking exposures made on the filmstrip substantially between successive pairs of the exposure-locating perforations.

SUMMARY OF THE INVENTION

According to the invention there is provided a detecting apparatus, such as used in photofinishing, for finding a reference exposure which is made on a leading and/or trailing non-perforated portion of a filmstrip that precedes or follows a series of evenly spaced perforations in the filmstrip having a pitch slightly greater than the width of respective picture-taking exposures made on the filmstrip substantially between successive pairs of the perforations and which is located in conformity with the pitch, the detecting apparatus comprising:

a pair of sensors spaced apart a distance which is the same as the pitch of the series of perforations to be able to simultaneously detect successive pairs of the perforations; and means for determining that one of the sensors has detected one of the perforations and the other has not to find the reference exposure made on the leading or trailing non-perforated portion of the filmstrip.

DETAILED DESCRIPTION OF THE INVENTION REFERENCE EXPOSURE MAKING APPARATUS

Figure 1:
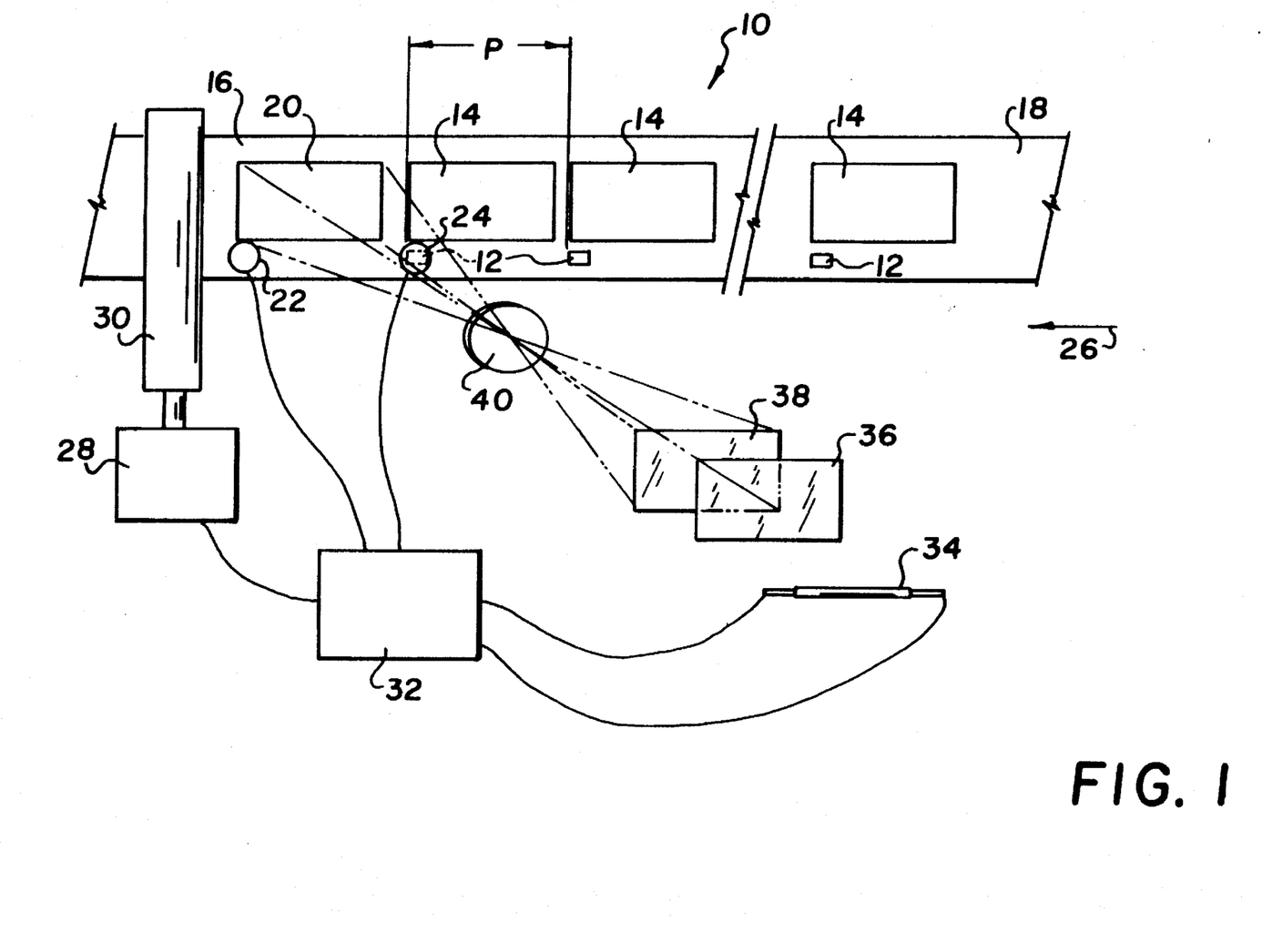
FIG. 1 is a schematic view of apparatus for making a reference exposure on a leading and/or trailing portion of a filmstrip, as disclosed in the cross-referenced application.

Looking at FIG. 1, there is shown a 35mm filmstrip 10 that has a series of evenly spaced identical metering (exposure locating) perforations 12 with a pitch P that is slightly greater than the width (36mm) of conventional 24 ×36mm scene exposures 14 made on the filmstrip when the photographer takes pictures with a camera. Each one of the metering perforations 12 is associated with a single one of the scene exposures 14, and they act as key points to critically locate the scene exposures during picture-taking in the camera. Thus, the camera can only make as many picture-taking or scene exposures 14 as there are metering perforations 12, and each one of the scene exposures will be located in an exact position on the filmstrip 10.

As shown in FIG. 1, the filmstrip 10 has a pair of unexposed leading and trailing non-perforated portions 16 and 18 which precede and follow the scene exposures 14 and the associated perforations 12. An object of the invention is to make a 24 ×36mm reference (or test) exposure 20 on the leading and/or trailing portion 16 or 18 in conformity with (the pitch of) the scene exposures 14.

To accomplish the object, apparatus is shown in FIG. 1 which includes a pair of known perforation sensors 22 and 24, such as infrared emitters and detectors, that are spaced apart a distance which is the same as the pitch P of the series of metering perforations 12 to be able to simultaneously detect successive pairs of the metering perforations as the filmstrip 10 is advanced in a forward direction indicated by the arrow 26. A known drive motor 28 and pair of film advance rollers (only one shown) 30 serve to move the filmstrip 10 in the forward direction 26.

Figure 2:
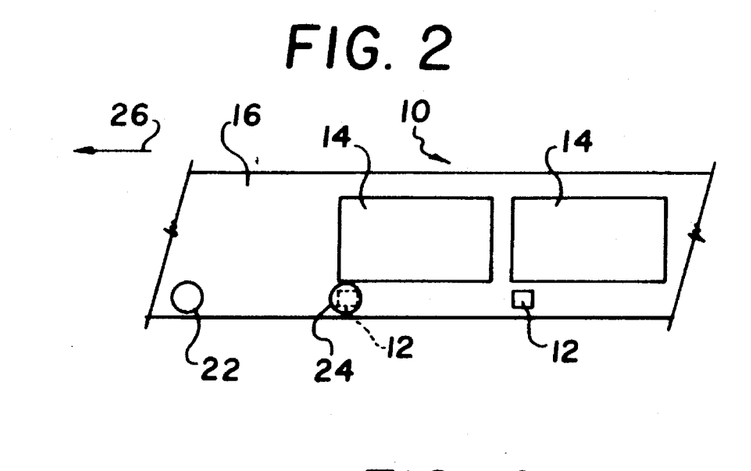
FIGS. 2–5 are schematic views depicting operational stages of the apparatus shown in FIG. 1.
Figure 3:
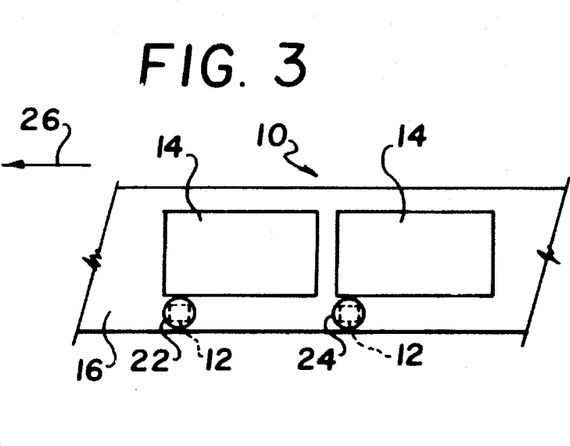
Figure 4:
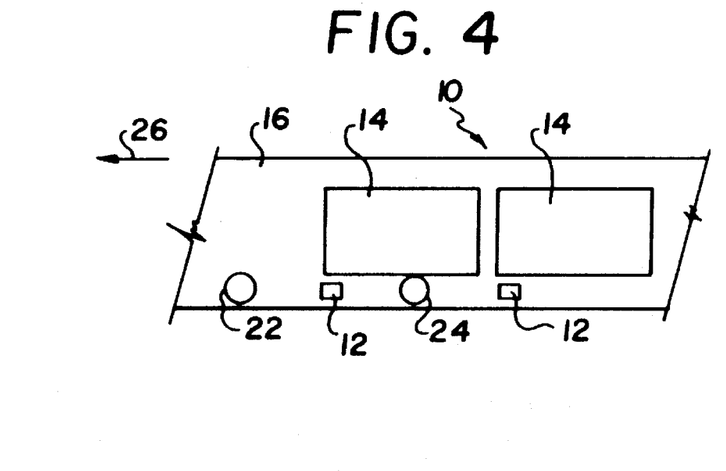
Figure 5:
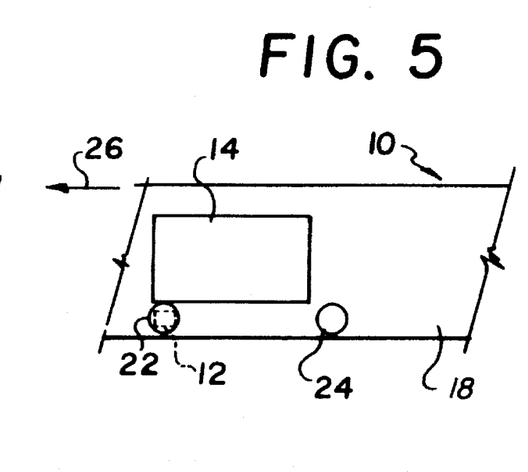

As shown in FIGS. 2–5, there are four combination-sensing states that the two sensors 22 and 24 can assume. One, the other, both, or neither of the sensors 22 and 24 will detect individual metering perforations 12 at any given time. In FIG. 2, the sensor 24 detects one of the metering perforations 12 and the sensor 22 does not. In binary terms, this can be expressed as "0, 1". In FIG. 3, both of the sensors 22 and 24 detect respective metering perforations 12. In binary terms, this can be expressed as "1, 1". In FIG. 4, neither of the sensors 22 and 24 detect individual metering perforations 12. In binary terms, this can be expressed as "0, 0". In FIG. 5, the sensor 22 detects one of the metering perforations 12 and the sensor 24 does not. In binary terms, this can be expressed as "1, 0". While the sensing states of the sensors 22 and 24 in FIGS. 3 and 4 are repeated, the sensing states of the sensors in FIGS. 2 and 5 occur only once, i.e. at the leading and trailing portions 16 and 18 of the filmstrip 10.

As shown in FIG. 1, a known microcomputer 32 is connected to the two sensors 22 and 24 and to a known light source 34 to ignite the light source only when the sensor 24 detects one of the metering perforations 12 and the sensor 22 does not (as in FIG. 2), i.e. the binary expression "0, 1". Light emitted from the light source 34 passes through a diffusing glass 36, a reference negative 38, and a fixed focus lens 40 to make the reference exposure 20 on the leading portion 16 in conformity with (the pitch of) the scene exposures 14. The microcomputer 32 does not ignite the light source 34 when both of the sensors 22 and 24 detect respective metering perforations 12 (as in FIG. 3), i.e. the binary expression "1, 1", when neither of the sensors 22 and 24 detect individual metering perforations 12 (as in FIG. 4), i.e. the binary expression "0, 0", and when the sensor 22 detects one of the metering perforations 12 and the sensor 24 does not, i.e. the binary expression "1, 0".

Alternatively, the microcomputer 32 can ignite the light source 34 only when the sensor 22 detects one of the metering perforations 12 and the sensor 24 does not (as in FIG. 5), i.e. the binary expression "1, 0". This would be to make the reference exposure 20 on the trailing portion 18 in conformity with (the pitch of) the scene exposures 14.

In another example, the microcomputer 32 can ignite the light source 34 when the sensor 24 detects one of the metering perforations 12 and the sensor 22 does not (as in FIG. 2), i.e. the binary expression "0, 1", and when the sensor 22 detects one of the metering perforations 12 and the sensor 24 does not (as in FIG. 5), i.e. the binary expression "1, 0". This would be to make the reference exposure 20 on the leading and trailing portions 16 and 18 in conformity with (the pitch of) the scene exposures 14. In this instance, the lens 40 would have to be adjusted with respect to the two sensors 22 and 24 for the two modes or an additional perforation would have to be added following the last one of the scene exposures 14.

In another example, the filmstrip 10 could have a series of two perforations for each of the scene exposures 14, preferably a leading perforation located approximately at the beginning of a scene exposure and a trailing perforation located approximately at the end of the scene exposure. The respective pairs of leading and trailing perforations would be evenly spaced along the filmstrip. Of course, the leading and trailing portions 16 and 18 of the filmstrip would not have any of these perforations. Also, there would be three sensors, i.e. an initial sensor, an intermediate sensor, and a final sensor. The intermediate and final sensors would be spaced apart a distance which is the same as the distance between the two perforations at each of the scene exposures, and the initial and intermediate sensors would be spaced apart a distance which is the same as the pitch between the leading perforations of the respective pairs of perforations. Consequently, there are six combination-sensing states that the three sensors can assume and are illustrated as follows:

| Initial Sensor | Intermediate Sensor | Final Sensor |
| --- | --- | --- |
| 0 | 1 | 1 |
| 0 | 1 | 0 |
| 0 | 0 | 0 |
| 0 | 0 | 1 |

| Initial Sensor | Intermediate Sensor | Final Sensor |
| --- | --- | --- |
| 1 | 1 | 1 |
| 1 | 1 | 0 |

The microcomputer 32 would ignite the light source 34 only when the intermediate and final sensors detect the leading and trailing perforations for a scene exposure and the initial sensor does not detect any of these perforations, i.e. the binary expression "0, 1, 1". This would occur only once (as in FIG. 2), and would be to make the reference exposure 20 on the leading portion 16 in conformity with (the pitch of) the scene exposures 14.

REFERENCE EXPOSURE DETECTING APPARATUS

According to the invention there is provided a detecting apparatus, such as used in photofinishing, for finding the reference exposure 20 made on the leading non-perforated portion 16 of the filmstrip 10 that precedes the series of evenly spaced perforations 12 in the filmstrip having the pitch P slightly greater than the width of the reference exposure and/or finding the reference exposure 20 made on the trailing non-perforated portion 18 of the filmstrip that follows the perforations. The reference exposure 20 made on the leading or trailing non-perforated portion 16 or 18 of the filmstrip 10 is located in conformity with the picture-taking or scene exposures 14 made on the filmstrip substantially between successive pairs of the perforations 12.

Figure 6:
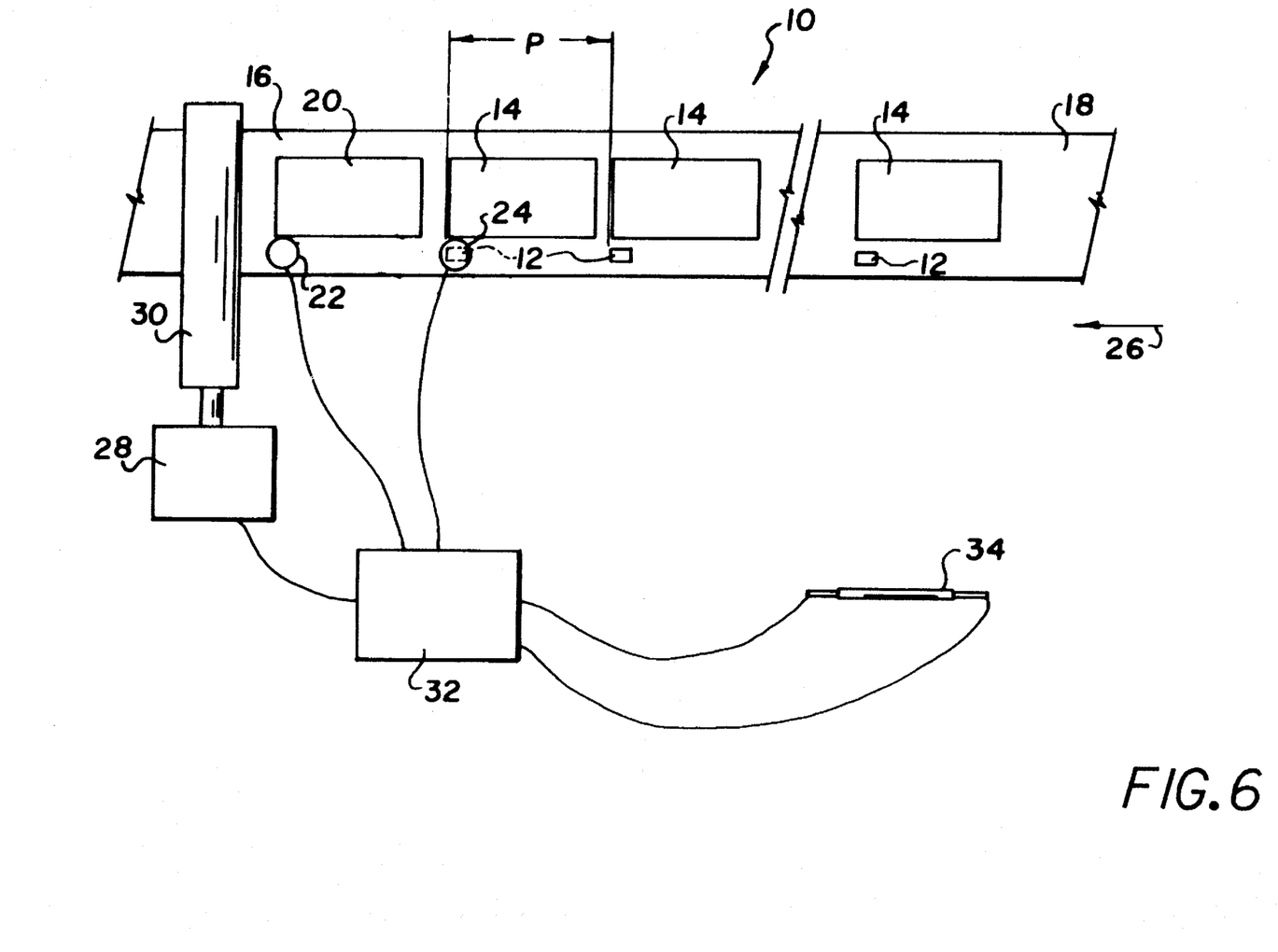
FIG. 6 is a schematic view of apparatus for finding a reference exposure made on a leading and/or trailing portion of a filmstrip, according to a preferred embodiment of the invention.

The detecting apparatus as shown in FIG. 6 comprises:

the pair of sensors 22 and 24 spaced apart a distance which is the same as the pitch P of the series of perforations 12 to be able to simultaneously detect successive pairs of the perforations; and the computer 32 for determining that one of the sensors 22 or 24 has detected one of the perforations 12 and the other sensor has not to find the reference exposure 20 made on the leading or trailing non-perforated portion 16 or 18 of the filmstrip 10.

Figure 7:
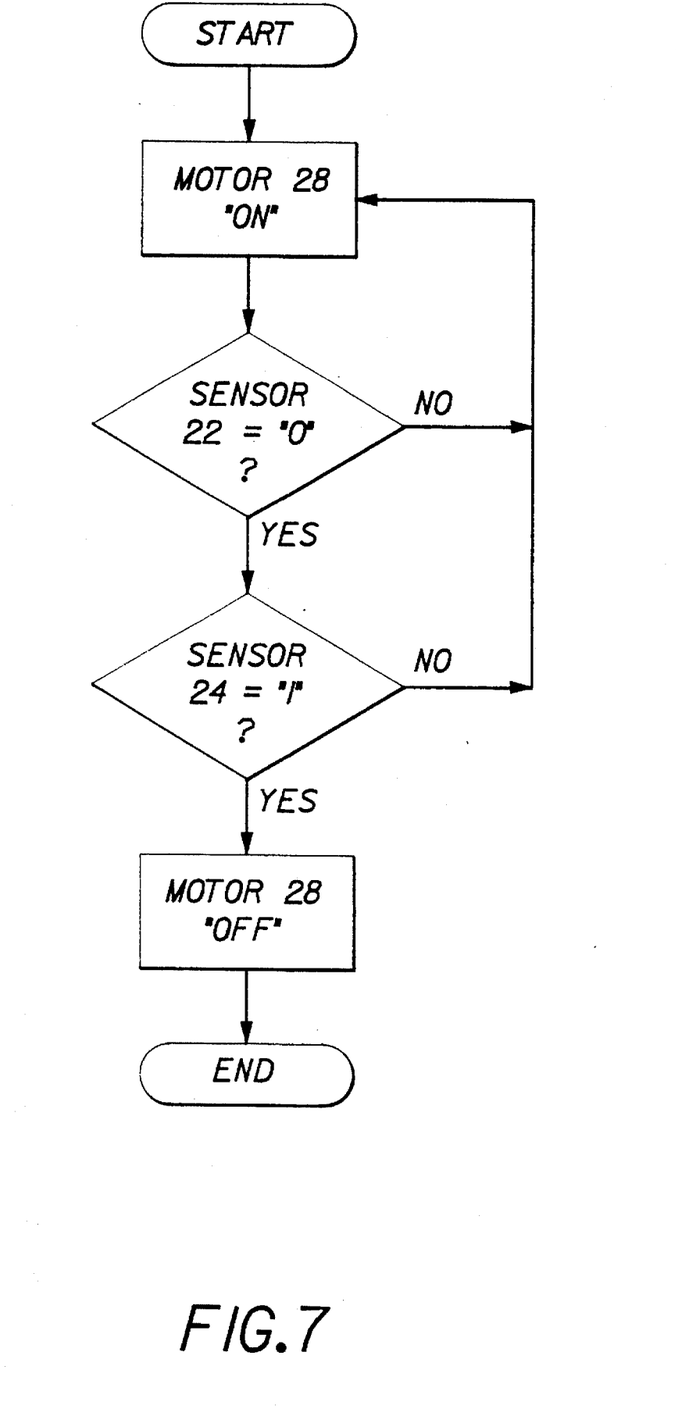
FIG. 7 is a flow chart for the apparatus shown in FIG. 6, indicating how the apparatus operates to find a reference exposure made on a leading portion of a filmstrip.
Figure 8:
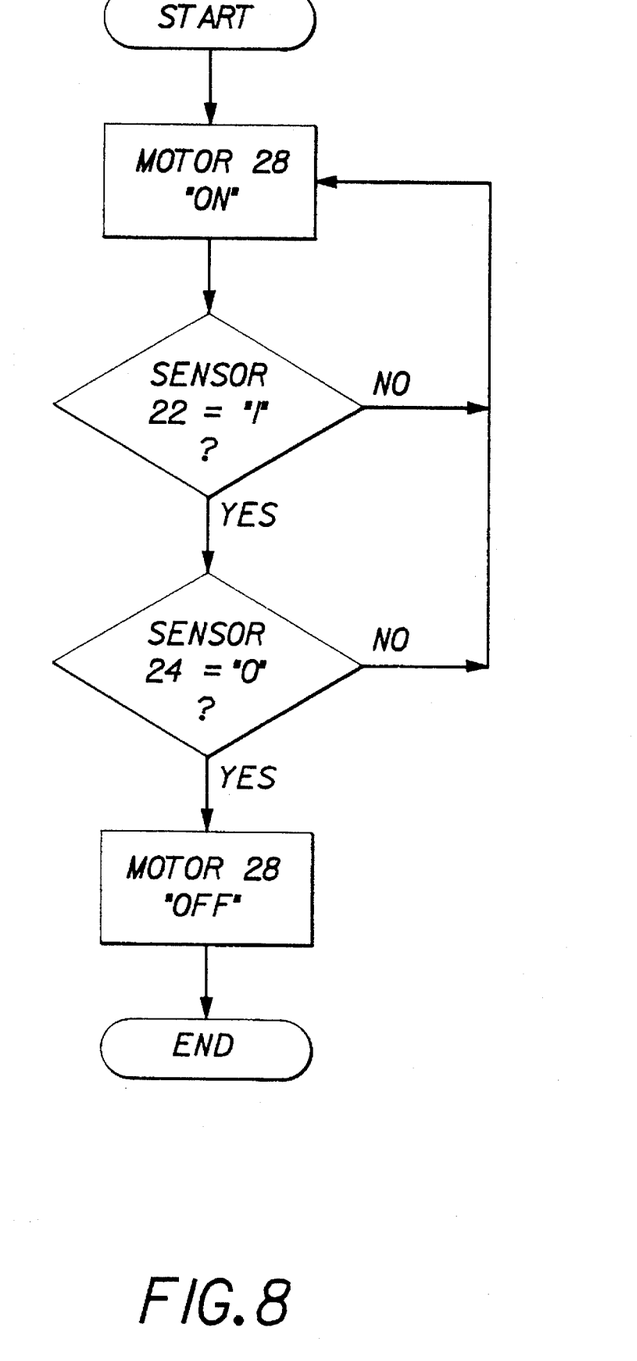
FIG. 8 is a flow chart for the apparatus shown in FIG. 6, indicating how the apparatus operates to find a reference exposure made on a trailing portion of a filmstrip.

To find the reference exposure 20 made on the leading non-perforated portion 16 of the filmstrip 10, the computer 32 in cooperation with the pair of sensors 22 and 24 as shown in the flow chart of FIG. 7 changes the drive motor 28 for the film advance rollers 30 from "on" to "off" when the sensor 24 detects one of the metering perforations 12 and the sensor 22 does not (as in FIG. 2), i.e. the binary expression "0, 1". Alternatively, to find the reference exposure 20 made on the trailing non-perforated portion 18 of the filmstrip 10, the computer 32 in cooperation with the pair of sensors 22 and 24 as shown in the flow chart of FIG. 8 changes the drive motor 28 for the film advance rollers 30 from "on" to "off" when the sensor 22 detects one of the metering perforations 12 and the sensor 24 does not (as in FIG. 4), i.e. the binary expression "1, 0".

Assuming the reference exposure 20 is a known gray scale, once the reference exposure 20 (in negative form) is found a color print can be made of it. Then, the color print can be visually compared with a standard color chart as described in prior art U.S. Pat. No. 4,260,245 to calibrate a printer in order to obtain a neutral hue of color prints to be made of the scene exposures 14 (in negative form). Alternatively, instead of making the color print of the reference exposure 20 (in negative form), digital representations of the red, green, and blue composition of light shining through the reference exposure (in negative form) from an illumination source in the printer can be obtained. Then, the digital representations can be compared with standard color values stored in a computer to calibrate the printer.

Figure 9:
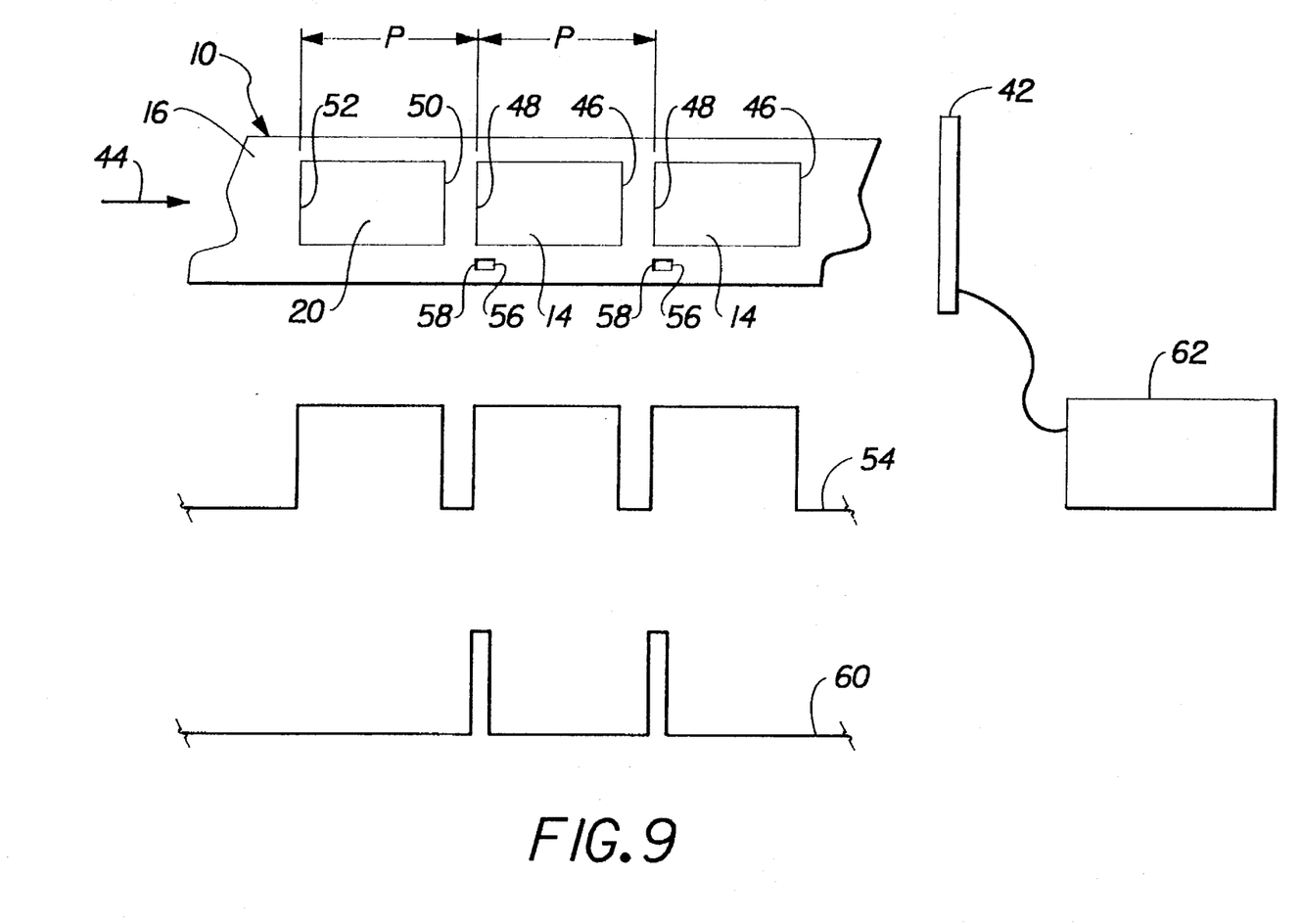
FIG. 9 is a schematic view of an alternative embodiment of the invention.

The invention has been described with reference to a preferred embodiment. However, it will be appreciated that variations and modifications can be effected by a person of ordinary skill in the art without departing from the scope of the invention. For example, instead of using the pair of sensors 22 and 24 to find the reference exposure 20 made on the leading non-perforated portion 16 of! the filmstrip as the filmstrip is moved in the forward direction 26, a conventional scanner 42 which continuously scans successive width sections of the filmstrip 10 as the filmstrip is moved in a reverse direction 44 can be used to find the reference exposure. As shown in FIG. 9, the scanner 42 scans in the region of each of the picture-taking or scene exposures 14 and the reference exposure 20 to be able to distinguish between exposed sections of the filmstrip 10 and respective unexposed sections of the filmstrip between successive pairs of the exposed sections. In particular, the scanner 42 first detects leading and trailing edges 46 and 48 of each of the scene exposures 14 and then detects leading and trailing edges 50 and 52 of the reference exposure 20. This is done for every increment of the pitch P as indicated by the scan output 54. At the same time, the scanner 42 scans in the region of each of the metering perforations 12 to be able to distinguish between the metering perforations 12 and non-perforated sections of the filmstrip 10 in line with the metering perforations. In particular, the scanner 42 detects leading and trailing edges 56 and 58 of each of the metering perforations 12. Likewise, this is done for each increment of the pitch P as indicated by the scan output 60. The two scan outputs 54 and 60 can be interrogated in a computer 62 to find the reference exposure 20.

PARTS LIST 10. filmstrip
12. metering perforations
14. scene exposures
16. leading portion
18. trailing portion
20. reference exposure
22. perforation sensor
24. perforation sensor
26. forward direction
28. drive motor
30. film advance rollers
32. microcomputer
34. light source
36. diffusing glass
38. reference negative
40. lens
42. scanner
44. reverse direction
46. leading edge
48. trailing edge
50. leading edge
52. trailing edge
54. scan output
56. leading edge
58. trailing edge
60. scan output
62. computer

I claim:

1. Detecting apparatus for finding a reference exposure which is made on a leading and/or trailing non-perforated portion of a filmstrip that precedes or follows a series of evenly spaced perforations in the filmstrip having a pitch slightly greater than the width of respective picture-taking exposures made on the filmstrip substantially between successive pairs of the perforations and which is located in conformity with the pitch, said detecting apparatus comprising:

a pair of sensors spaced apart a distance which is the same as the pitch of the series of perforations to be able to simultaneously detect successive pairs of the perforations; and means for determining that one of said sensors has detected one of the perforations and the other has not to find the reference exposure made on the leading or trailing non-perforated portion of the filmstrip.

2. Detecting apparatus for finding a reference exposure which is made on a leading and/or trailing non-perforated portion of a filmstrip that precedes or follows a series of evenly spaced perforations in the filmstrip having a pitch slightly greater than the width of respective picture-taking exposures made on the filmstrip substantially between successive pairs of the perforations and which is located in a known relation to the pitch, said detecting apparatus comprising:

means for detecting successive pairs of the perforations for respective increments of the pitch and, alternatively, for detecting only one of the perforations for only one of the increments of the pitch; and     means for determining that only one of the perforations for only one of the increments of the pitch has been detected to find the reference exposure made on the leading or trailing non-perforated portion of the filmstrip.

* * * * *